United States Patent [19]

Kusuda et al.

[11] Patent Number: 5,515,198
[45] Date of Patent: May 7, 1996

[54] OPTICAL ACTIVE MATRIX DISPLAY

[75] Inventors: Yukihisa Kusuda; Ayuri Fujiwara; Yoshihiro Izumi, all of Osaka, Japan

[73] Assignees: Nippon Sheet Glass Co., Ltd.; Sharp Kabushiki Kaisha, both of Osaka, Japan

[21] Appl. No.: 185,076

[22] Filed: Jan. 24, 1994

[30] Foreign Application Priority Data

Jan. 23, 1993 [JP] Japan .................................. 5-027607
Mar. 9, 1993 [JP] Japan .................................. 5-075332

[51] Int. Cl.⁶ .......................... G02B 26/08; G02F 1/1343
[52] U.S. Cl. ............................. 359/205; 359/57; 359/216
[58] Field of Search ........................... 359/42, 48, 196, 359/197, 204, 205, 206, 215, 216, 217, 663, 49, 72, 57

[56] References Cited

U.S. PATENT DOCUMENTS

| | | | |
|---|---|---|---|
| 4,008,967 | 2/1977 | Kiemle | 356/239 |
| 4,796,964 | 1/1989 | Connell et al. | 359/204 |
| 4,962,983 | 10/1990 | Watanabe | 359/217 |
| 4,978,977 | 12/1990 | Ohmori et al. | 359/217 |
| 5,148,008 | 9/1992 | Takenaka | 359/217 |
| 5,200,849 | 4/1993 | Inagaki et al. | 359/196 |
| 5,220,450 | 6/1993 | Iizuka | 359/205 |

FOREIGN PATENT DOCUMENTS

| | | |
|---|---|---|
| 439146A2 | 7/1991 | European Pat. Off. . |
| 454503A2 | 10/1991 | European Pat. Off. . |
| 1-173016 | 7/1989 | Japan . |
| 3198013 | 8/1991 | Japan ................ 359/197 |
| 451111 | 2/1992 | Japan ................ 359/199 |
| 2062277 | 5/1981 | United Kingdom . |

*Primary Examiner*—Paul M. Dzierzynski
*Assistant Examiner*—Darren E. Schuberg
*Attorney, Agent, or Firm*—Lowe, Price, LeBlanc & Becker

[57] ABSTRACT

An optical active matrix display uses a light beam through a plurality of lightguide paths in a transparent substrate for switching signals to display an image. The display includes end surfaces of the lightguide paths appearing on one side surface of the transparent substrate. A light source issues at least one light beam. A rotating polygon mirror scans the direction of the light beam. An optical system changes an angle of the light beam reflected by the rotating polygon mirror so that the light beam is incident at the end surface of the lightguide paths irrespective of the scanning direction. The optical system subjects the principal rays of the light beam to a substantially constant angle with respect to the end surfaces of the lightguide paths.

4 Claims, 7 Drawing Sheets

OPTICAL ACTIVE MATRIX DISPLAY

BACKGROUND OF THE INVENTION

The present invention relates to an optical active matrix display of a type that uses an optical scanner having a rotating polygon mirror. The present invention is particularly suitable for large-area liquid crystal displays and can be used in various kinds of audio-visual (AV) equipment and office automatic (OA) equipment.

Having the ability to produce high-quality pictures, a liquid crystal display of active matrix is becoming part of the mainstream of liquid crystal displays. However, thin-film transistors (TFT) of which the active matrix is formed are fabricated by a complicated sequence of process steps and defects are prone to occur mainly in crossing areas of the metallization. The yield of production is lowered by the defects, and it is difficult to reduce the manufacturing cost thereof.

In accordance with the demand for large capacity display equipment, recently it is necessary to increase the number of pixels from 400×600 to 1,000×1,000 or more and, at the same time, the display screen is required to increase the size from the current size 10 inches (254 mm diagonal) to a bigger size 20 inches (508 mm diagonal). In liquid crystal display device of an active matrix type, particularly using of thin-film transistors (TFT), the length of metalized lines is that the resistance of metalized line increase accordingly, as a result, there is a problem of delayed signal waveforms due to the resistance of metalized lines and stray capacity thereof. Alternately, a liquid crystal display device of a simple matrix type is-not free from a problem; in proportion to increment of the scanning line accompanying to a screen enlarged, a difficulty insuring the voltage ratio (duty ratio) between pixels selected and non-selected increases, and the difficulty results in deteriorated display characteristics.

The following apparatus is provided to solve these problems, that is an optical active matrix display as shown in FIGS. 6 and 7 (Japanese Patent Unexamined Publication No. Hei 1-173016, etc.). As shown, the display comprises a glass substrate 101 having a plurality of parallel lightguide paths 102 formed in the surface thereof; a plurality of photoconductive material elements 103 are provided over the lightguide paths 102 in contact with the light channels which are deficient of the cladding so that part of the light passing along the lightguide paths 102 will be emitted toward the photoconductive material elements 103 overlying thereon. The individual photoconductive material elements 103 perform on-off control to switch back and forth between strips 104 and strips 105 in the form of a thin metal film, thereby working as optical switch elements 106. One group of strips 105 are connected to the pixel electrodes 107 which form pixels in liquid crystal display and an image electric signal for liquid crystal display is applied to the other group of strips 104, whereby said image electric signal is applied to the pixel electrodes 107 via the optical switch elements 106. In the case shown in FIG. 7, the strips 104 are formed in the horizontal direction whereas the lightguide paths 102 are formed in the vertical direction. When light is applied on the lightguide paths 102, the overlying optical switch elements 106 will turn on and the electric signal carried on the metal strips 104 is applied to the pixel electrodes 107, thereby controlling the molecular alignment of the liquid crystal. Suppose here that light is incident on the lightguide paths 102 in the order from the left end of FIG. 7. If light is first applied into the lightguide path 102 at the left end, all of the optical switch elements 106 provided over the particular lightguide path 102 will turn on but other optical switch elements 106 provided over the other rows of lightguide path 102 remain off state. Then, a picture signal (electric signal corresponding to pixel information) is applied to the strips 104, whereupon the same electric signal is applied to the pixel electrodes on the left row in FIG. 7, whereby the molecular alignment of the internal liquid crystal is controlled. The same applies to the second-to-the-right row of pixel elements 107. By repeating the procedure just described above, the picture signal is applied successively to all pixel electrodes 107 and the molecular alignment of the liquid crystal is properly controlled to display a desired picture.

Optical active matrix displays of the type described above require that light be applied successively into the individual lightguide paths. To meet this requirement, it has been proposed that light-emitting devices (e.g., LEDs, LDs and EL devices) be formed in association with the individual lightguide paths.

While there are several methods for scanning light, one way is to scan laser light with an optical system including a rotating polygon mirror, etc., as is typically effected in laser printers. The scanning system of a laser printer is shown in FIG. 12, in which a laser beam 140 reduced to a spot size of about 100 μm is focused by convergence lens 150 for scanning over the surface of a photoreceptor drum 110 by a rotating polygon mirror 122.

A problem with the above-described system in which a light-emitting device is provided for each lightguide path is that at least several hundred and, usually, more light-emitting devices are necessary to fabricate liquid crystal display of ordinary size. This causes difficulty in assuring uniformity in the intensity of emission from the individual devices and it is not only cumbersome to mount such a great number of devices but there also occurs a problem in that the scanning light source composed of these devices is considerably too expensive. Furthermore, the necessity of controlling the light emission from the individual devices in time sequence cases inevitably to require a complicated control circuit.

The light scanning system which is conventionally used with laser printers has several features; to mention a few, laser light is subjected to intensity modulation in accordance with the desired information to be displayed, and the fθ lens which is used as a focusing lens to concentrate light on the scan surface of a photoreceptor drum need not be closely controlled in terms of the angle of principal rays that are receipt on the scan surface of the photoreceptor drum. Therefore, as will become apparent from the detailed description disclosed later, a display of uniform quality cannot be presented by merely combining the known light source and optical system with the optical active matrix display of the type described above.

SUMMARY OF THE INVENTION

Therefore, the present invention has been accomplished under these circumstances and has as an object to provide an optical active matrix display of a type that scans light with a rotating polygon mirror and which is furnished with an optical system so as to insure that the individual lightguide paths in the active matrix can be addressed effectively and uniformly in an easy manner with light from a limited number of light sources, whereby the characteristics of the optical switch elements are sufficiently stabilized to enable the display of high-quality pictures.

The present invention relates to an improvement of an optical active matrix display that includes a plurality of lightguide paths arranged in one direction in the plane of a transparent substrate, a plurality of linear electrodes arranged to intersect said lightguide paths for applying an image signal, pixel electrodes arranged in an array for image display, and an array of optical switch elements that are located near the intersections of the respective lightguide paths and linear electrodes for connecting said linear electrodes to said pixel electrodes, and wherein said optical switch elements are shifted from an off-state to an on-state in response to light that travels through said lightguide paths to enter the optical switch elements. To attain the aforementioned objects of the present invention, the optical active matrix display is provided with the lightguide paths formed in a construction such that end surfaces thereof appear on said transparent substrate and an optical scanner is provided, which includes a light source for issuing a light beam, a rotating polygon mirror changing the direction of said light beam, and a lens applying the light beam as reflected by said rotating polygon mirror at the above end surfaces of the lightguide paths by changing the angle thereof irrespective of the scanning direction.

In the embodiment, as the lens applying the light beam to the end surfaces, a lens array having a plurality of lenses disposed in positions that correspond to the individual lightguide paths is preferably provided adjacently at the end surfaces of the lightguide paths, whereby the light beam that passes through the lens array is concentrated near the end surfaces of those lightguide paths. The lenses in the lens array may be of any type such as an ordinary convex lens, a Fresnel lens, etc. In order to prevent crosstalk in display, a light-shielding layer is preferably provided in an optimal position of the path from the rotating polygon mirror to the surface of the substrate on which the lightguide paths are formed. If such a light-shielding layer is to be provided, its width is preferably made larger than the spot diameter of the light beam that will be incident on it.

Moreover, as a preferred structure of the present invention, the lightguide paths are formed in such a way that their end surfaces appear on said transparent substrate and they have an optical scanner that comprises a light source for issuing two light beams, a rotating polygon mirror that changes the direction of said light beams, a lens with which the angle of the light beams are reflected by said rotating polygon mirror is changed so that they are directed towards the end surfaces of said lightguide paths irrespective of the scanning direction, and a lens array that is positioned at the end surfaces of said lightguide paths for concentrating the light beams near the end surfaces of those lightguide paths. The lens array consists of two lens groups arranged in two rows, one lens group consisting of odd-numbered side lenses that are arranged in positions that correspond to odd-numbered rows in the lightguide paths and the other lens group consisting of even-numbered side lenses that are arranged in positions that correspond to even-numbered rows in the lightguide paths. The lens array is so adapted that the light beam scanning the group of odd-numbered side lenses will be launched into the odd-numbered rows in the lightguide paths, alternately the light beam scanning the group of even-numbered side lenses is launched into the even-numbered rows in the lightguide paths.

Preferably a photodetector device is provided in the light beam scan starting side of the lens array or the transparent substrate, whereby the output from the photodetector device is used as a trigger signal to control the writing of image information. In yet another preferred embodiment, an array of photodetector devices may be provided in such a way that the individual photodetector devices are located at the exit end surfaces of the respective lightguide paths in the optical active matrix; this arrangement is effective in assuring that the power to be supplied to the light source is controlled in such a way that a substantially constant photocurrent will flow out of the individual photodetector devices.

The light beam issuing from the light source is effectively controlled in direction so that it travels towards the rotating polygon mirror, which, by its rotation, causes continuous change in the direction of reflected light so that the light beam will scan to sweep a fan-shaped area. The lens causes the scanning light beam to travel towards the end surfaces of the lightguide paths in the optical active matrix. In this case, the lens refracts the principal rays of the light beam so that they form a substantially constant angle with the lens array irrespective of the scanning direction. The optical active matrix display of the present invention is so adapted that the end surfaces of the lightguide paths appear on the transparent substrate and, therefore, the light beam concentrated by the lens array is incident at the end surfaces of the lightguide paths, whereupon it enters the latter. If the angle between the end surfaces of the substrate for the lightguide paths form and the principal rays of the light beam varies greatly depending on the location of light incidence, the light entering the individual lightguide paths will fluctuate in quantity, thereby making it impossible to produce a uniform display image. To avoid this problem, the angle at issue must be held constant and, most preferably, it should be substantially 90° in order to provide high efficiency.

If a lens array having a plurality of lenses arranged in positions that correspond to the individual lightguide paths is provided at the end surfaces of those lightguide paths, the incident light beam is concentrated by the individual lenses to assure more efficient use of the light. The lens array is also effective in allowing the light beam to be concentrated at a fixed point at all times even if the scan position of the beam fluctuates on account of various factors such as mechanical variations. As a result, the optical active matrix display of the present invention becomes less sensitive to mechanical or temperature variations and its operation is stabilized in a very effective way.

The optical active matrix display of the present invention may have a light-shielding layer provided on the side of the lightguide paths where the light beam is incident and this is effective in preventing crosstalk in display.

The optical active matrix display of the present invention may be so adapted that two light beams issue alternately from a light source. One of the two light beams scans a group of odd-numbered side lenses and enters successively the lightguide paths in odd-numbered rows, whereas the other light beam scans a group of even-numbered lenses and enters successively the lightguide paths in even-numbered rows. Thus, interlaced scanning is accomplished in the present invention by means of a lens array having the two lens groups arranged in two rows.

A photodetector device may be provided on the optical beam scan starting side of the lens array or the transparent substrate and the output from this photodetector device can be used as a trigger signal to control the writing of image information.

The optical active matrix display of the present invention may also be provided with an array of photodetector devices that correspond to the exit end surfaces of the respective lightguide paths in the active matrix. By controlling the supply of power to the light source in such a way that the array will produce substantially constant light signals, the definition of display, or its image resolution, can be enhanced.

DETAIL DESCRIPTION OF THE PREFERRED EMBODIMENTS

Figure 1:
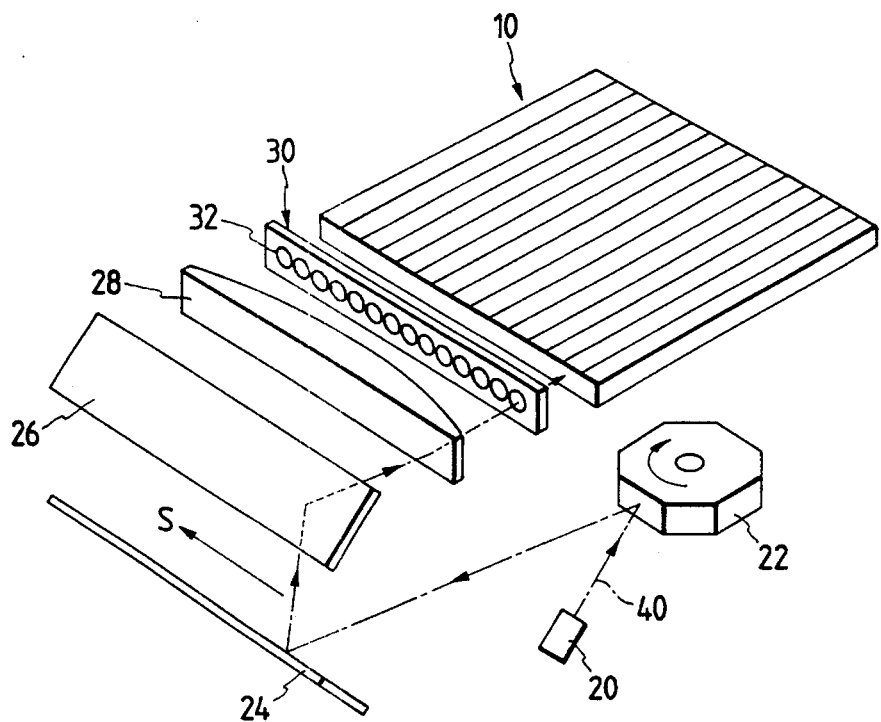
FIG. 1 is a structural view showing the construction of an optical active matrix display according to an embodiment of the present invention.
Figure 2:
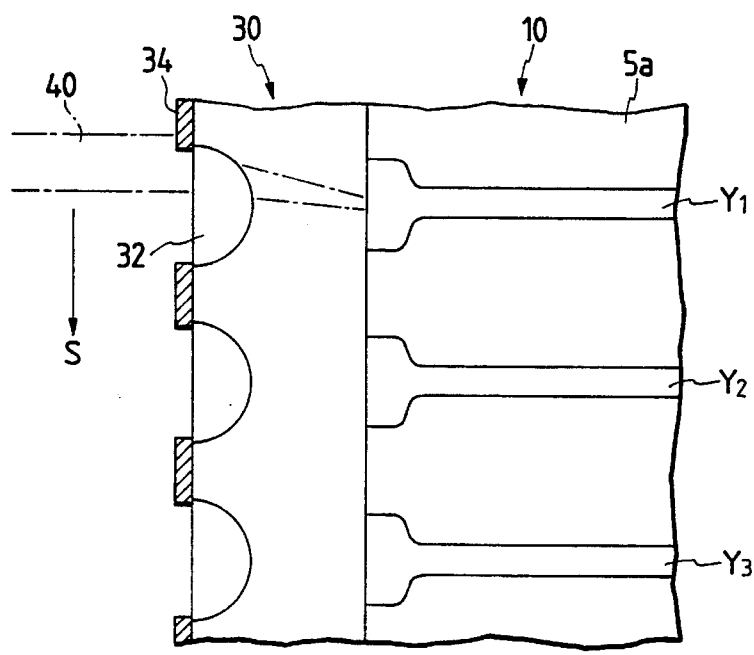
FIG. 2 is a magnified sectional view of the lens array shown in FIG. 1.

FIG. 1 is a structural view showing an example of the optical active matrix display according to an embodiment of the present invention. FIG. 2 is a magnified sectional view of the lens array shown in FIG. 1, showing how an incident light beam enters a lightguide path.

Figure 3:
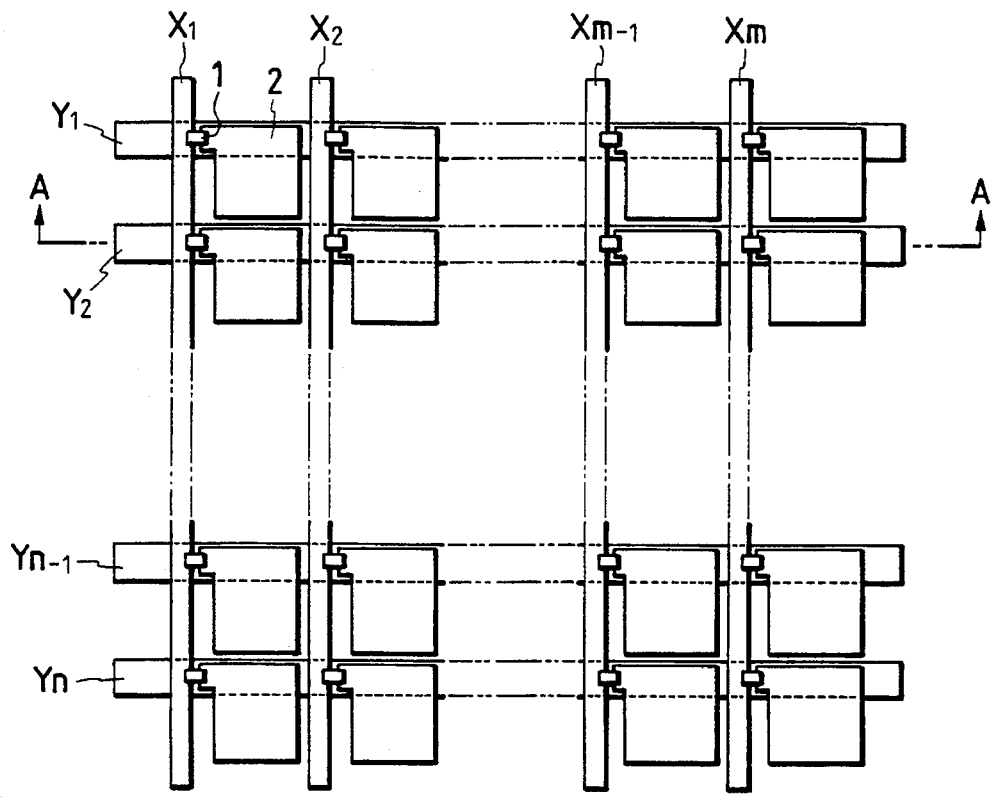
FIG. 3 shows the construction of the substrate for an array of lightguide paths in the optical active matrix display shown in FIG. 1.
Figure 4:
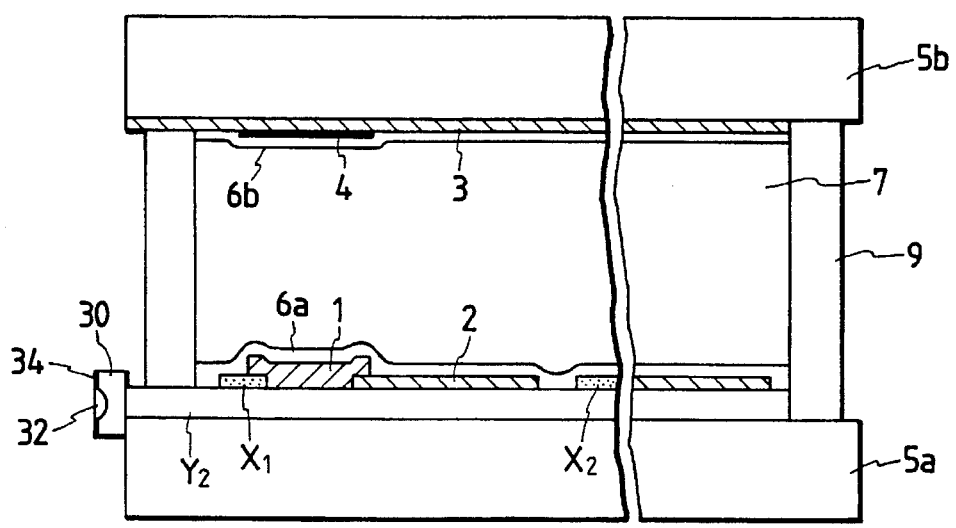
FIG. 4 is a sectional view of a line A—A of FIG. 3.

Let us first describe an example of a substrate 10 for an array of lightguide paths that is to be used in the optical active matrix display of the present invention. FIG. 3 shows the basic arrangement of the lightguide paths and FIG. 4 is a sectional view of the line A—A in FIG. 3. For the purpose of clarity, the glass substrates, transparent electrode, liquid crystal layer and sealant are omitted from FIG. 3. As shown in FIGS. 3 and 4, a plurality of lightguide paths $Y_1, Y_2, \ldots, Y_{n-1}$ and $Y_n$ are arranged in the Y-direction on one of the two glass substrates 5a and a plurality of linear electrodes $X_1, X_2, \ldots, X_{m-1}$ and $X_m$ are arranged in the X-direction in such a way that they cross over these lightguide paths. The lightguide paths $Y_1, Y_2, \ldots, Y_{n-1}$ and $Y_n$, the linear electrodes $X_1, X_2, \ldots, X_{m-1}$ and $X_m$, and pixel electrodes 2 for driving a display medium such as a liquid crystal are formed in the same plane, so that optical switch elements 1 will be positioned in such a way that they connect the linear electrodes $X_1, X_2, \ldots, X_{m-1}$ and $X_m$ to the pixel electrodes 2. A transparent electrode 3 is provided on the other glass substrate 5b and a liquid crystal layer 7 is contained in the space defined by the two glass substrates 5a and 5b and the sealant 9. In the present invention, the lightguide paths $Y_1, \ldots Y_n$ are formed on the glass substrate 5a in such a way that the end surfaces of the sequence of those lightguide paths will appear at an end surface of the glass substrate 5a.

The optical scanner used with the optical matrix display of the example under consideration is shown in FIG. 1 and it comprises laser optical system 20, a rotating polygon mirror 22, two reflector mirrors 24 and 26, and telecentric optical system 28 which is composed of a toric lens (which is hereunder referred to simply as "telecentric optical system"). As specifically shown in FIGS. 2 and 4, the array substrate 10 is further provided with a lens array 30 at an end surface. A light beam 40 issuing from the laser optical system 20 is reflected by the polygon mirror 22 which is motor driven or otherwise rotated at a constant speed, whereby the light beam is moved (scanned) continuously to sweep a fan-shaped area. The scanning direction is indicated by arrow S. The scanned light beam is reflected by the two reflector mirrors 24 and 26 so that it changes in direction before entering the telecentric optical system 28. The telecentric optical system 28 which refracts the incident light beam performs a correcting function in that the refracted light beam will emerge in a direction substantially normal to an end surface of the array substrate 10 irrespective of the scanning direction. Because of this effect, the light beam will be launched into the lens array 30 in a substantially normal direction throughout the period from the start of scanning to its end. The lens array 30 concentrates the incident light beam in predetermined positions on the entrance end surface of the array substrate 10. The individual lenses 32 are arranged in positions that correspond to the lightguide paths $Y_1, \ldots Y_n$ in a one-to-one relationship.

As shown in FIG. 2, the light beam through the telecentric optical system 28 is refracted by the convex lenses 32 in the lens array 30 so that it enters the individual lightguide paths $Y_1, \ldots Y_n$. The function of the convex lenses 32 is to concentrate the scanned light beam so that it is focused at predetermined points of incidence on the corresponding lightguide paths $Y_1, \ldots Y_n$. The position of light concentration is invariable in the scanning process. Thus, the provision of the lens array 30 assures the light beam to fall on a fixed point of concentration even if it is incident in varying positions on the entrance surface of the lightguide paths; as a result, it becomes possible to avoid problems due to such factors as mechanical or temperature variations, low precision, etc.

If the laser light 40 is launched into the lightguide paths $Y_p, \ldots Y_n$ and when the optical switch elements 1 are illuminated with light, the electric resistance of the latter will decrease and the image signal from the linear electrode $X_i$ is applied to the pixel electrodes 2, whereupon the state of molecular alignment of the liquid crystal will change. Therefore, if the lightguide paths $Y_1$ to $Y_n$ are scanned successively with the laser light 40 and electric signals are applied accordingly to the linear electrodes $X_1, \ldots X_m$, the optical switch elements 1 on the respective lightguide paths $Y_1, \ldots Y_n$ will turn on as long as the light travels along those paths, whereby the electric signals from the linear electrodes $X_1, \ldots X_m$ are applied to the respective pixel electrodes 2. In other words, the optical signals traveling through the lightguide paths $Y_1, \ldots Y_n$, rather than the electric gate signal on thin-film transistor devices, will insure that the optical switch elements connecting to those lightguide paths are successively turned on, one row at a time. The light source that can be used in the present invention is not limited to the semiconductor laser and any other lasers such as an IR laser and a UV laser may be used as long as they emit light at wavelengths at which the photoconductive layer forming the optical switch elements 1 is sensitive.

Figure 5:
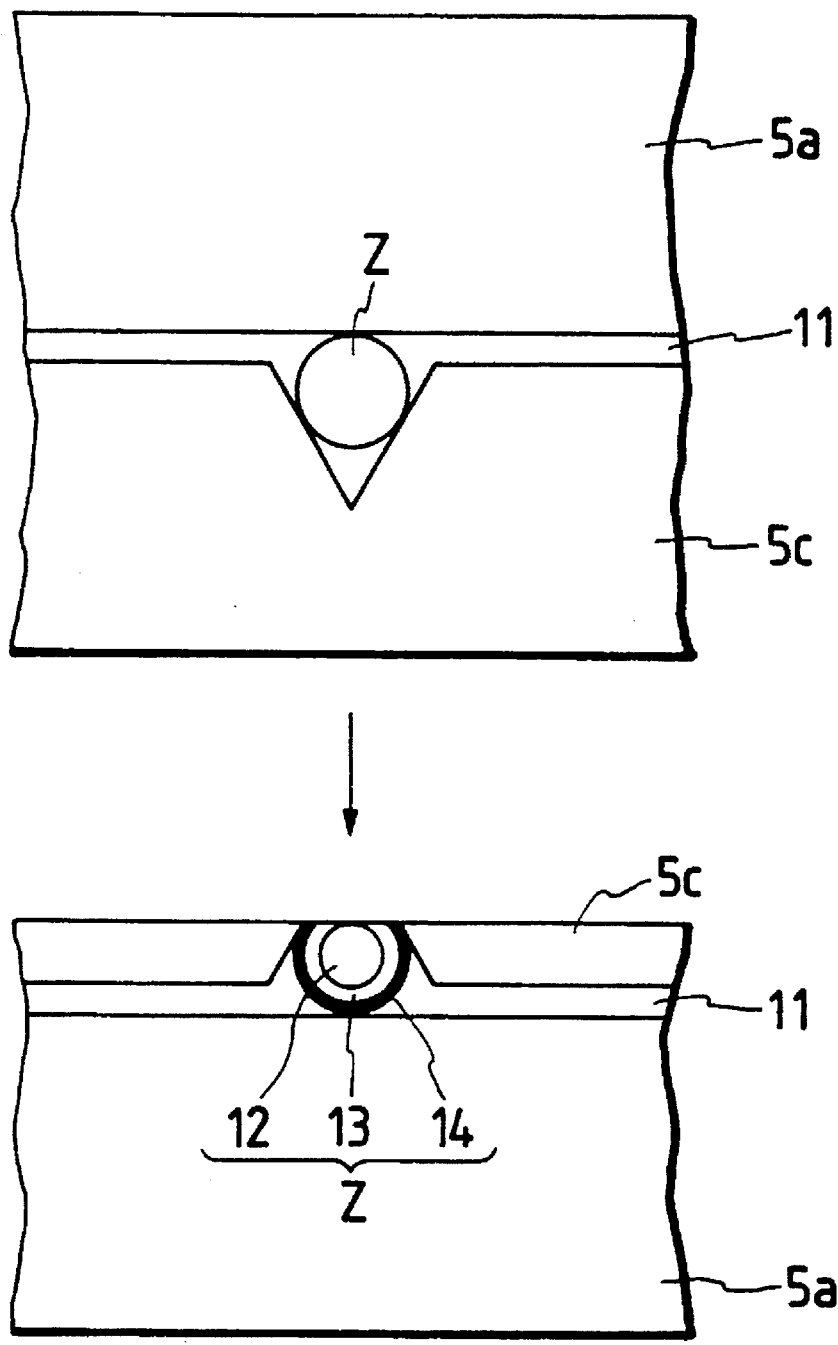
FIG. 5 shows two steps in the process of fabricating the substrate for an array of lightguide paths in the optical active matrix display shown in FIG. 1.

The substrate for an array of lightguide paths which is shown in FIG. 3 may be prepared by the procedure described below. FIG. 5 is a diagram of the substrate at two different steps of the preparation process. In FIG. 5, grooves are formed with a blade in the surface of a glass substrate 5c. The width of each groove is determined by the diameter of the cladding of an optical fiber Z to be used and it is typically in the range from about 5 to 500 μm. The pitch between grooves is determined by the panel size and the desired image resolution and it is typically in the range 150 to 800 μm, preferably 300 to 600 μm. The grooves are shown to have a V-shaped cross section in FIG. 5 but their bottom may be flat or semicircular. Grooves may be worked by a chemical method such as etching. Optical fiber Z is placed in each of the grooves thus formed and a UV curable resin 11 is applied over the glass substrate 5c. Thereafter, the other glass substrate 5a is placed on top of the substrate 5c and the resin 11 is cured by illumination with a uv radiation. The optical fiber Z is of such a structure that the center core 12 is surrounded by a cladding 13 which in turn is covered with a light-shielding layer 14. In the next step, the surface of the glass substrate 5c is optically polished towards the optical fiber Z until part of the light propagating through the optical fiber Z will leak out.

A photoconductive layer which serves as the optical switch element 1 is formed at grid points (Y, X) where the lightguide paths $Y_1, \ldots Y_n$ intersect the linear electrodes $X_1, \ldots X_m$. To form this photoconductive layer, a hydrogenated amorphous silicon (a-Si:H) film is first formed by plasma-assisted chemical vapor deposition and then patterned by etching. Depending on the wavelength of the light source to be used, the photoconductive layer may be formed of other materials such as a hydrogenated amorphous silicon germanium (a-SiGe:H) film, a hydrogenated amorphous silicon carbide (a-SiC:H) film, a hydrogenated amorphous silicon oxide (a-SiO:H) film and a hydrogenated amorphous silicon nitride (a-SiN:H) film. In the next step, aluminum or other metals are deposited by electron beam evaporation or other techniques and then patterned by etching to form linear electrodes $X_1, \ldots X_m$. Other linear electrode forming materials include metals such as molybdenum and alloys such as indium-tin oxide.

To form pixel electrodes 2, indium-tin oxide is applied by sputtering and then patterned by etching. The lightguide paths, linear electrodes, optical switch elements and pixel electrodes are then overlaid with an alignment layer 6a, which is made of a spin-coated and subsequently rubbed polyimide film. The alignment layer 6a may alternatively be formed by printing. A transparent electrode 3 is provided over the other glass substrate 5b. This transparent electrode 3 is formed of indium-tin oxide that is applied by sputtering. The transparent electrode 3 is overlaid with a light-shielding layer 4 that is formed in registry with the pattern of the optical switch elements 1 which are formed of the photoconductive layer on the opposing glass substrate 5a. The light-shielding layer 4 is formed of aluminum that is deposited by electron-beam evaporation and the applied aluminum is subsequently etched. The light-shielding layer 4 may alternatively be formed of a metal such as molybdenum or an organic or inorganic pigment loaded resin. In the case under consideration, the light-shielding layer 4 is formed on the transparent electrode 3 but, if desired, it may be formed on the back side of the glass substrate 5b. The transparent electrode and the light-shielding layers are subsequently overlaid with an alignment layer 6b, which is also may be rubbing a polyimide film. With the necessary layers formed in the manner just described above, the two glass substrates 5a and 5b are kept apart by a spacer (not shown) and then bonded with a sealant 9 interposed. A liquid crystal is injected under vacuum into the space between the two substrates, thereby providing a liquid crystal layer 7. This liquid crystal layer 7 has a thickness of about 5 μm and its display mode is a normally white twisted nematic (TN) type. Art exemplary liquid-crystal material is available from Merck & Co., Inc. under the trade name ZLI-1565 (PCH liquid crystal). After a liquid crystal display panel furnished with the array of lightguide paths is fabricated in the manner described above, a lens array 30 is mounted.

As shown in FIGS. 2 and 4, the optical active matrix display of the embodiment under consideration has a light-shielding layer 34 provided between adjacent convex lenses 32 at the entrance end surface of the lens array 30. In the absence of the light-shielding layer 34, light may potentially be distributed between two adjacent lightguide paths when the incident light beam moves from one convex lens to the next one. Hence, the light-shielding layer 34 is provided in order to prevent the incident light beam from entering two lightguide paths simultaneously. To this end, the width of the light-shielding layer 34 must be greater than the spot diameter of the incident light beam. In the embodiment under consideration, the light-shielding layer is provided between convex lenses 30 but this is not the sole case of the invention and the light-shielding layer may be situated in any effective position between the rotating mirror and the substrate for lightguide paths; thus, it may be provided between the lens array 30 and the substrate 10 for the array of lightguide paths.

The lens array 30 just described above can be fabricated by various methods, among which the following ion-exchange procedure is typical. First, a metal film is formed over a glass substrate containing an alkali such as sodium and small openings (holes) are made in the film. The glass substrate carrying the perforated metal film is immersed in a solution containing ions such as thallium ions, whereupon the alkali ions in those areas of the glass substrate which are beneath the openings in the metal film are replaced by thallium ions. The areas of the glass substrate where replacement by the thallium ions has taken place have a higher refractive index than the other areas. As the time of this ion exchange process is prolonged, the exchange between alkali and thallium ions progresses, creating hemispherical regions with elevated refractive index around the openings in the metal film. These regions will function as convex lenses. By altering the position of holes that are to be formed in the metal film, the site of lens formation in the array can be determined freely.

In the embodiment under consideration, two reflector mirrors are used in combination but the number and arrangement of reflector mirrors may be modified as appropriate for the specific composition of optical system. It should also be noted that the lens array to be used in the present invention is not limited to the makeup described above and individual lenses may be otherwise worked types such as a Fresnel lens and a hologram.

Figure 8:
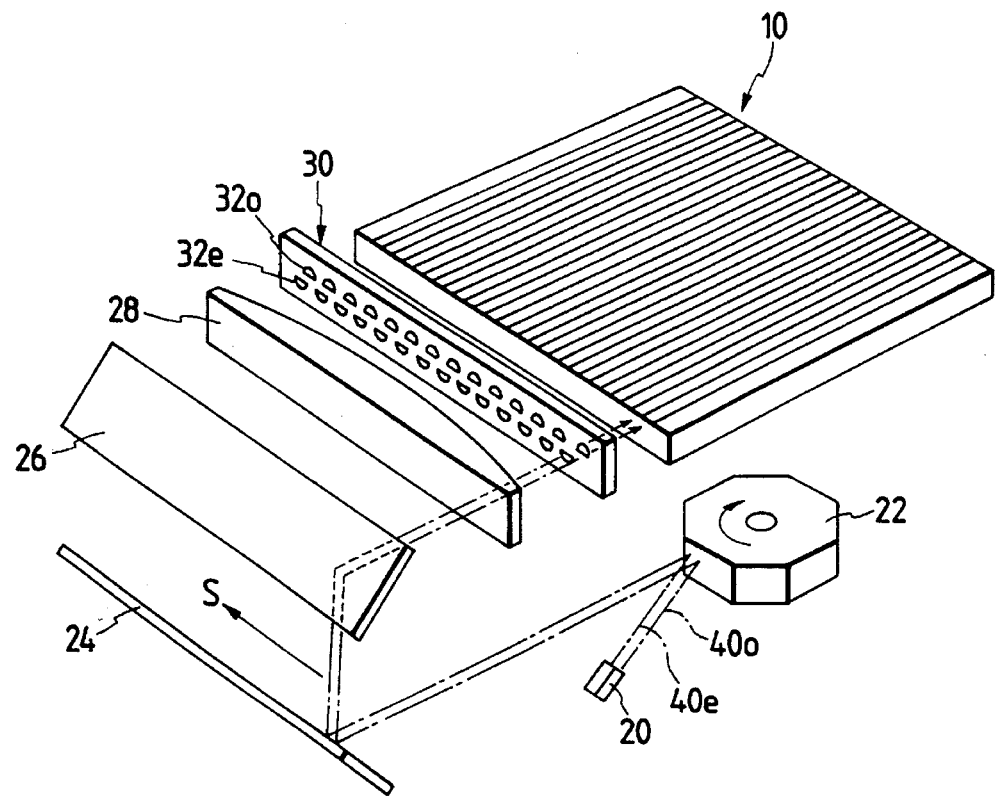
FIG. 8 is a structural view showing the construction of an optical active matrix display according to another embodiment of the present invention.
Figure 12:
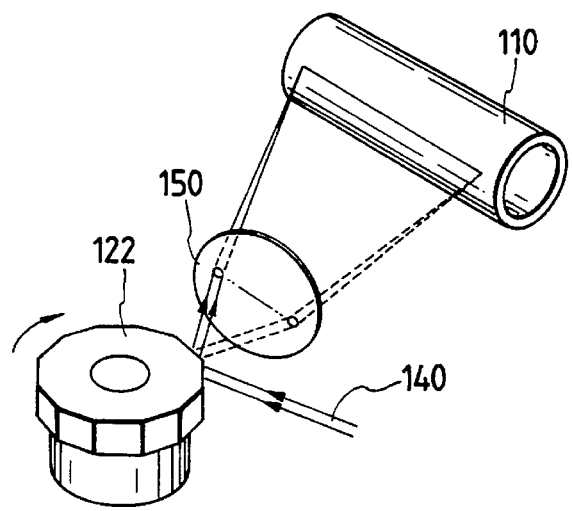
FIG. 12 shows the layout of scanning optical system for a laser printer.
Figure 9A:
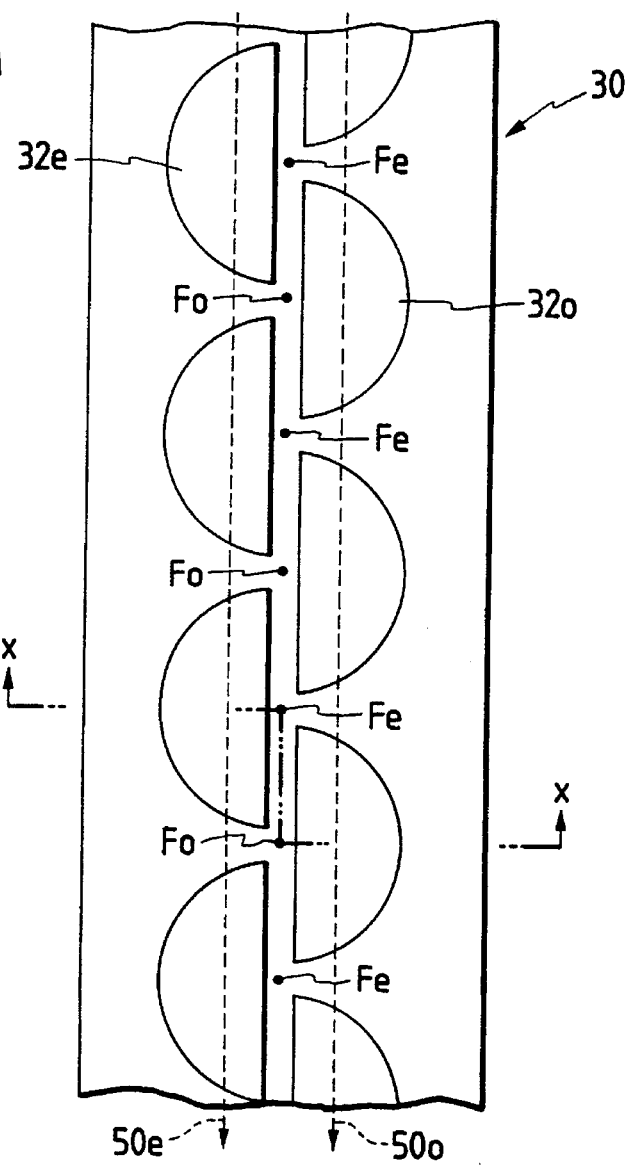
FIG. 9A and 9B are enlarged views of a lens array.
Figure 9B:
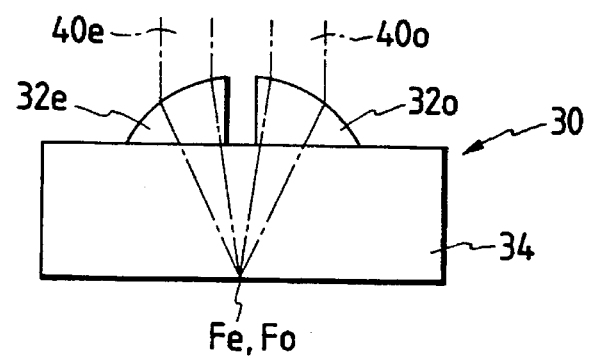
Figure 10:
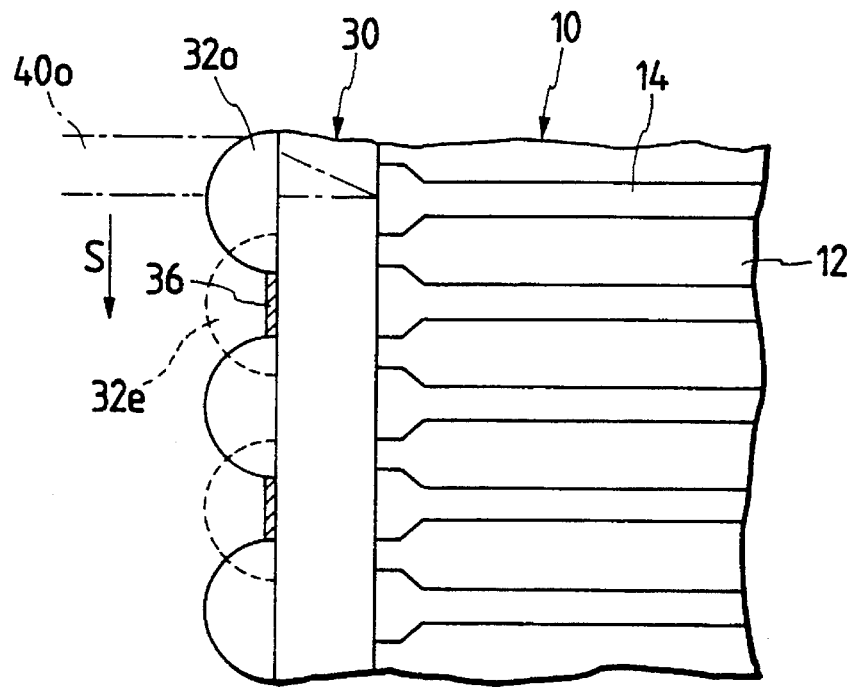
FIG. 10 is an explanatory view showing how the lens array is optically coupled to the substrate for an array of lightguide paths.

The second embodiment of the present invention is described below with reference to drawings. FIG. 8 is a structural view showing the composition of an example of an optical active matrix display according to the second embodiment. FIG. 9A and 9B show details of the lens array used in the active matrix display, and FIG. 10 illustrates how the substrate for an array of lightguide paths is optically coupled to the lens array so as to achieve effective entrance of a light beam into an individual lightguide path.

Figure 6:
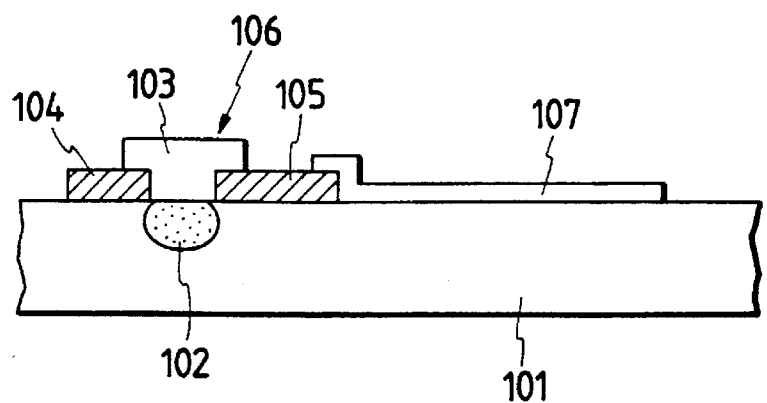
FIG. 6 is a cross section showing enlarged the essential part of a prior art optical active matrix display.
Figure 7:
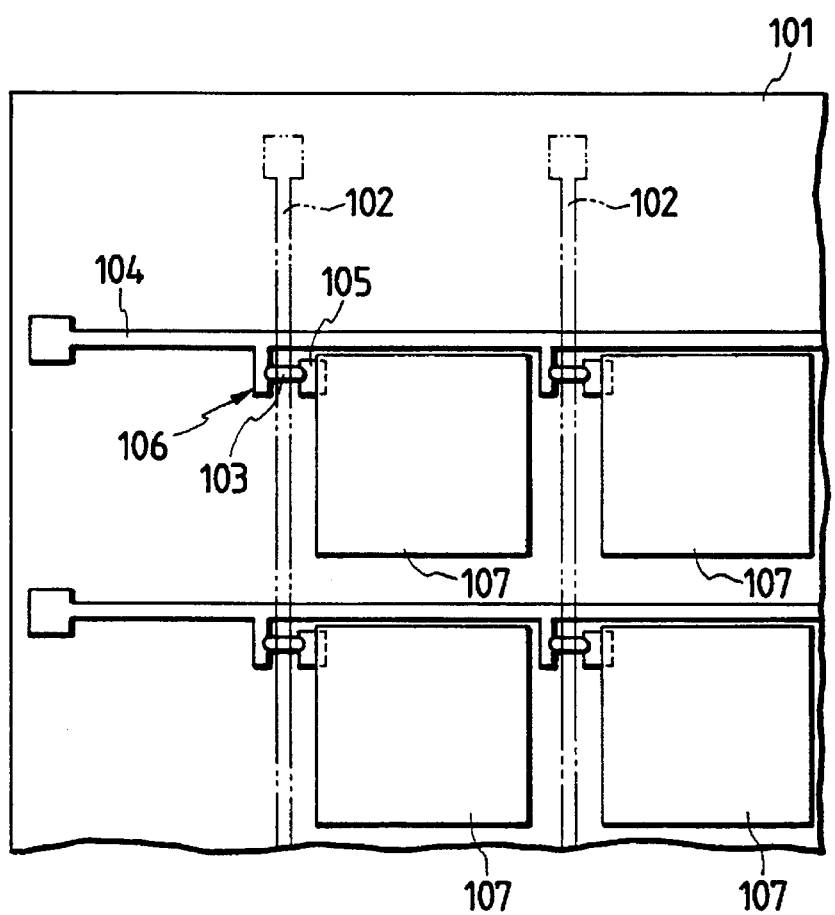
FIG. 7 is a partial enlarged plan view of the prior art optical active matrix shown in FIG. 6.

The substrate 10 for the array of lightguide paths may be basically the same as the prior art version which is shown in FIGS. 6 and 7. Hence, for the sake of simplicity of explanation, details of the respective parts of the substrate are not repeated in the following description. It should, however, be noted again that as shown in FIG. 10, lightguide paths 14 are formed on a transparent substrate 12 in such a way that the end surfaces of the sequence of those lightguide paths will appear at an end surface of the transparent substrate 12.

The optical scanner used with the optical matrix display of the example under consideration comprises semiconductor laser optical system 20 that issues two light beams, a rotating polygon mirror 22, two reflector mirrors 24 and 26, telecentric optical system 28 and a lens array 30. The semiconductor laser optical system 20 emits two light beams 40o and 40e alternately at different timings, 40o being the light beam for scanning a group of odd-numbered lenses and 40e being the light beam for scanning a group of even-numbered lenses. The two light beams are reflected by the polygon mirror 22 which is motor driven or otherwise rotated at a constant speed, whereby the light beams are moved (scanned) continuously to sweep a fan-shaped area. The scanning direction is indicated by arrow S. The light beams thus scanned are reflected by the two reflector mirrors 24 and 26 so that they change in direction before entering the telecentric optical system 28 in two vertically different positions. The toric lens 28 (telecentric optical system) which refracts the incident light beams performs a correcting function in that the refracted light beams will emerge in a direction substantially normal to an end surface of the lens array 30 irrespective of the scanning direction. Because of this effect, the light beams will be launched into the lens array 30 in a substantially normal direction throughout the period from the start of scanning to its end.

The lens array 30 under consideration consists of two lens groups that extend horizontally in an upper and a lower row; one lens group consists of odd-numbered lenses 32o that are arranged in positions that correspond to the lightguide paths in odd-numbered rows and the other lens group consists of even-numbered lenses 32e that are arranged in positions that correspond to the lightguide paths in even-numbered rows. Details of the arrangement of the two lens groups are as shown in FIG. 9A and 9B, in which FIG. 9A is a plan view and FIG. 9B is a sectional view of a line X—X in FIG. 9A. Each of the odd-numbered lenses 32o and even-numbered lenses 32e is a convex lens having a semicircular cross section and these odd- and even-numbered lenses are arranged alternately in a regular fashion on the transparent substrate 34 so that their foci (Fo, Fe), or points of concentration, will be lined up in a straight line. Thereafter, the lens array 30 is coupled optically to the substrate 10 for the array of lightguide paths in such a way that the respective foci (Fo, Fe) will come in registry with the positions in which light is incident at the end surfaces of the corresponding lightguide paths (see FIG. 10). As a result of this coupling, the light beam 40o which scans the group of odd-numbered lenses 32o is refracted by those lenses to be launched into the lightguide paths in odd-numbered rows and the light beam 40e which scans the group of even-numbered lenses 32e is refracted by those lenses to be launched into the lightguide paths in even-numbered rows. In FIG. 9A, the laser scanned line for odd-numbered fields is indicated by numeral 50o and the laser scanned line for even-numbered fields is indicated by 50e.

The incident light is transmitted through the lightguide paths 14 and is subjected to the operation of the liquid crystal display in the manner described herein under the heading "Prior Art" As already mentioned, the function of the convex lenses 32o and 32e is to concentrate the scanned light beams so that they are focused at predetermined points of incidence on the corresponding lightguide paths 14. The position of focus or light concentration is invariable in the scanning process. Thus, the provision of the lens array 30 assures the light beams to fall on a fixed point of concentration even if they are incident in varying positions on the entrance surface of the lens array; as a result, it becomes possible to avoid problems due to such deleterious factors as mechanical or temperature variations, low precision, etc.

The process of operating the optical active matrix according to the second embodiment of the present invention starts with turning on the laser in the optical system 20 that is associated with the scanning of odd-numbered lenses and the issuing light beam 40o is reflected by the polygon rotating mirror 22 to scan along the line 50o in FIG. 9A. As a result of this scan cycle, the light beam 40o is focused at point Fo and enters the row of corresponding odd-numbered lightguide paths in succession. In the next scan cycle, the laser that is associated with the scanning of even-numbered lenses is turned on. The issuing light beam 40e scans along the line 50e for even-numbered fields and it is focused at point Fe to enter the row of corresponding even-numbered lightguide paths in succession. By alternating the first and second scan cycles, interlaced scanning is accomplished.

Preferably a light-shielding layers 36 are provided not only between odd-numbered convex lenses 32o but also between even-numbered convex lenses 32e at the entrance end surface of the lens array 30. The provision of the light-shielding layers is effective in preventing each of the incident light beams from being distributed between two adjacent lightguide paths when the beam moves from one convex lens to the next one. To become effective, the light-shielding layer has preferably a width greater than the spot diameter of each light beam.

In the above-described two embodiments of the present invention, the light beam has to be reflected by the rotating polygon mirror and the accompanying unevenness in rotation and other defects make it difficult to control precisely the timing at which the light beam is launched into individual lightguide paths. To cope with this problem, preferably the light beam is watched by a photodetector device that is provided in the position of the lens array where light beam scanning starts. For example, each of the two lens groups may be provided one element of lens to add the number of each numbered lightguide paths and a photodetector device may be provided at the end surfaces of the substrate for the array of lightguide paths corresponding to the additional lens elements. This arrangement enables to detect signals at the time of the light beam scanning start by the photodetector devices, and if the detected signals is recognized as image frame start signals, the timing control of various jobs such as the writing of image information may be performed precisely.

Figure 11:
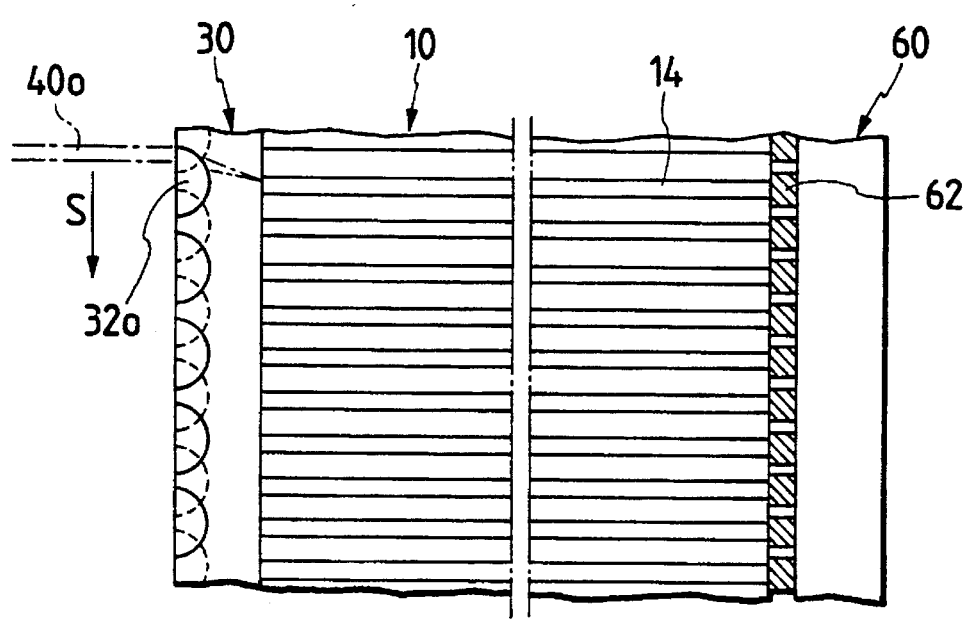
FIG. 11 is an explanatory view showing how an array of photodetector devices is mounted on the substrate for an array of lightguide paths.

According to another embodiment of the present invention, an array of such photodetector devices may be used as shown in FIG. 11. The array indicated by 60 in FIG. 11 consists of a plurality of photodetector devices 62 and is provided at the exit end surface of the substrate 10 for the array of lightguide paths. To be more specific, the photodetectors 62 are arranged in positions that correspond to the exit end surfaces of the respective lightguide paths 14. On the other hand, the scanning light beam will undergo variations in the quantity of light on account of various factors such as positional offset due to low mechanical precision and temperature fluctuations. To cope with this problem, a laser light watching light-receiving device may be located near the semiconductor laser to thereby controlling the laser drive power supply so as to insure a constant laser output. However, there is a possibility that the light launched into lightguide paths may fluctuate due to other mechanical factors. The advantage of the arrangement shown in FIG. 11 is such that the light transmitting through the individual lightguide paths is launched into the corresponding photodetector devices 62 and that the photocurrent due to light reception can be picked up by an external circuit. The current supply to the semi-conductor laser is controlled so that the photocurrent thus picked up will be substantially constant for the outputs of all lightguide paths in the substrate 10. As a result, any reactions may occurring due to various factors are compensated, and the quantity of the incident light into the lightguide paths can be controlled at a constant level, to thereby accomplish positive addressing with light.

In the above embodiments, two reflector mirrors are used in combination, but the number and arrangement of reflector mirrors may be modified as appropriate for the specific composition of optical system. It should also be noted that the lens array to be used in the present invention is not limited to the makeup described above and individual lenses may be otherwise worked types such as a Fresnel lens and a hologram.

As was described above, an optical active matrix display according to the present invention is so adapted that a light beam is reflected by a rotating polygon mirror for scanning and subsequent launching into lightguide paths. Hence, the number of the required parts for the display is sufficiently reduced to permit easy assembly and, that is inexpensive fabrication. Further, the display is subjected to less of the adverse effects caused by such deleterious factors as mechanical variations and, hence, its operational stability is improved.

Further the optical active matrix display according to the present invention is so adapted that a light beam is reflected by a rotating polygon mirror for scanning and that a lens array in which a group of odd-numbered lenses and a group of even-numbered lenses are arranged in two rows is used to concentrate incident light, thereby allowing it to enter lightguide paths in two different rows, one being odd-numbered rows and the other being even-numbered rows. With this arrangement, the interlaced scanning may be performed by alternating scan cycles using two light beams.

What is claimed is:

1. An optical active matrix display using light beam through a plurality of lightguide paths in a transparent substrate for switching signals as to image display, comprising:

end surfaces of said lightguide paths appearing on one side surface of said transparent substrate;

a light source for issuing at least one light beam;

a rotating polygon mirror for scanning the direction of said light beam;

an optical means for changing an angle of said light beam reflected by said rotating polygon mirror so that said light beam is incident at said end surfaces of said lightguide paths irrespective of directions of said scanning, wherein said optical means includes a lens array having a plurality of lenses corresponding to the individual lightguide paths, respectively, adjacent to said end surfaces of said lightguide paths, said lens array concentrating said light beam to said end surfaces of said lightguide paths, and wherein said optical means includes a micro lens and telecentric optical elements having a toric lens.

2. An optical active matrix display using light beam through a plurality of lightguide paths in a transparent substrate for switching signals as to image display, comprising:

end surfaces of said lightguide paths appearing on one side surface of said transparent substrate;

a light source for issuing at least one light beam;

a rotating polygon mirror for scanning the direction of said light beam;

an optical means for changing an angle of said light beam reflected by said rotating polygon mirror so that said light beam is incident at said end surfaces of said lightguide paths irrespective of directions of said scanning, wherein said optical means includes a lens array having a plurality of lenses corresponding to the individual lightguide paths, respectively, adjacent to said end surfaces of said lightguide paths, said lens array concentrating said light beam to said end surfaces of said lightguide paths, wherein said light source issues two light beams, and wherein said lens array consists of two lens groups arranged in two rows, one lens group consisting of odd-numbered side lenses corresponding to odd-numbered rows of said lightguide paths, and the other lens group consisting of even-numbered side lenses corresponding to even-numbered rows of said lightguide paths, wherein one of said light beams for scanning said group of odd-numbered side lenses is launched into said odd-numbered rows, and the other light beams for scanning the group of even-numbered side lenses is launched into said even-numbered rows, and both light beams are launched alternatively.

3. An optical active matrix display using a light beam for displaying an image, comprising:

a substrate including a plurality of lightguide paths receiving an image light beam representing the image, end surfaces of said lightguide paths appearing on at least one side surface of said substrate, said lightguide paths transmitting the image light beam for displaying the image;

a light source for issuing at least one light beam;

a rotating polygon mirror for scanning the direction of said at least one light beam; and a telecentric optical system comprising a micro lens and telecentric elements having a toric lens, receiving said at least one light beam from said rotating polygon mirror, and changing an angle of said at least one light beam generating said image light beam, said image light beam being incident at said end surfaces of said lightguide paths irrespective of the direction of scanning.

4. The display according to claim 3, wherein said telecentric optical system changes the angle of said at least one light beam generating said image light beam substantially uniformly incident at said end surfaces of said lightguide paths.

\* \* \* \* \*